United States Patent [19]
Brawn

[11] Patent Number: 4,838,408
[45] Date of Patent: Jun. 13, 1989

[54] VENEER STRAIGHTENER

[75] Inventor: Philip E. Brawn, Eugene, Oreg.

[73] Assignee: Brawn-Cardin Mill Equipment Manufacturing, Inc., Eugene, Oreg.

[21] Appl. No.: 202,814

[22] Filed: Jun. 6, 1988

[51] Int. Cl.$^4$ ............................................. B65G 47/26
[52] U.S. Cl. ................................... 198/434; 271/233; 198/461
[58] Field of Search ............... 198/440, 434, 411, 456, 198/461, 460, 462, 464.2, 604, 623, 626, 415, 699.1, 624; 271/233 X, 243, 244, 245

[56] References Cited

U.S. PATENT DOCUMENTS

| | | | |
|---|---|---|---|
| 2,604,322 | 7/1952 | Babicz | 198/434 X |
| 2,604,971 | 7/1952 | Snyder et al. | 198/462 X |
| 2,828,917 | 4/1958 | Wheeler et al. | 198/461 X |
| 3,348,655 | 10/1967 | Pierce, Jr. et al. | 198/461 |
| 3,696,911 | 10/1972 | Lunden | 198/464.2 X |
| 3,737,019 | 6/1973 | Coleman et al. | 198/464.2 |
| 4,257,514 | 3/1981 | Ver Mehren | 198/461 X |
| 4,547,115 | 10/1985 | Charbonnet | 198/434 X |

OTHER PUBLICATIONS

Xerox Disclosure Journal; 5/1976, vol. 1, No. 5, John Looney.

Primary Examiner—Robert J. Spar
Assistant Examiner—James R. Bidwell
Attorney, Agent, or Firm—John F. Ingman

[57] ABSTRACT

A veneer straightener, operating with a moving conveyor, includes two endless chains outwardly flanking the sides of the conveyor, the endless chains being mounted on drive sprockets powered through a common drive shaft. Mounted on the endless chains are a pair of upwardly extending lugs which are aligned with each other transverse to the direction of movement of the conveyor, and which extend above the moving conveyor belts. The upwardly extending lugs move in the direction of forward movement of the conveyor, but at a speed slower than that of the conveyor. A switch is triggered by an approaching sheet of veneer, which initiates the drive power and starts the forward movement of the lugs. As the moving sheet overtakes the lugs, it will be restrained by the lugs to a straightened or squared position. Upon reaching the forward sprocket the lugs will follow the spocket down and away from their restraining engagement and the squared sheet will resume the forward speed of the conveyor. Relieved from engagement with the sheet of veneer, a lug will trip a second switch, which will cause the drive power to disengage and the endless chains to stop. Two pairs of lugs may be utilized, being positioned on the endless chains so that when the second switch stops the progress of the endless chains, a second set of lugs is automatically positioned for the next sheet of veneer.

5 Claims, 3 Drawing Sheets

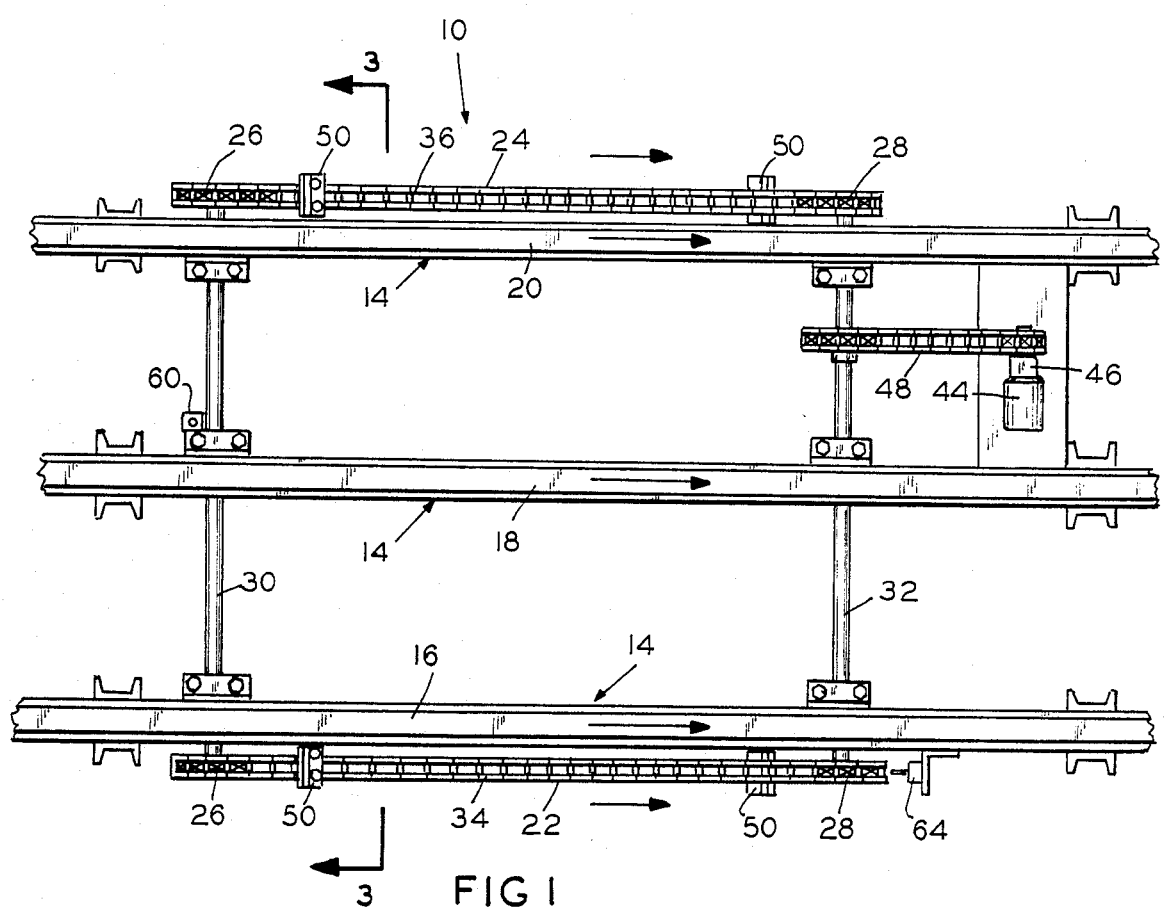
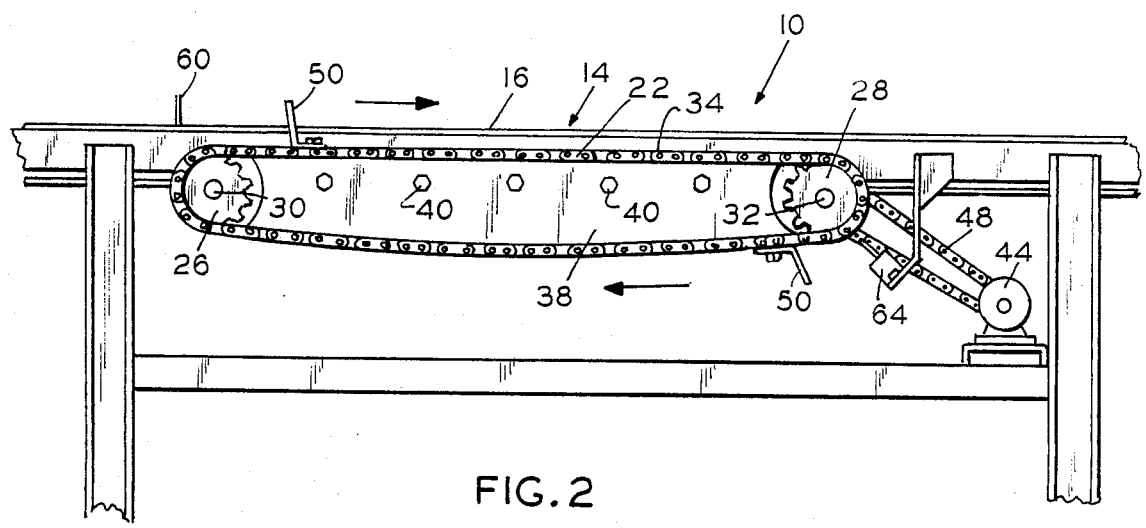

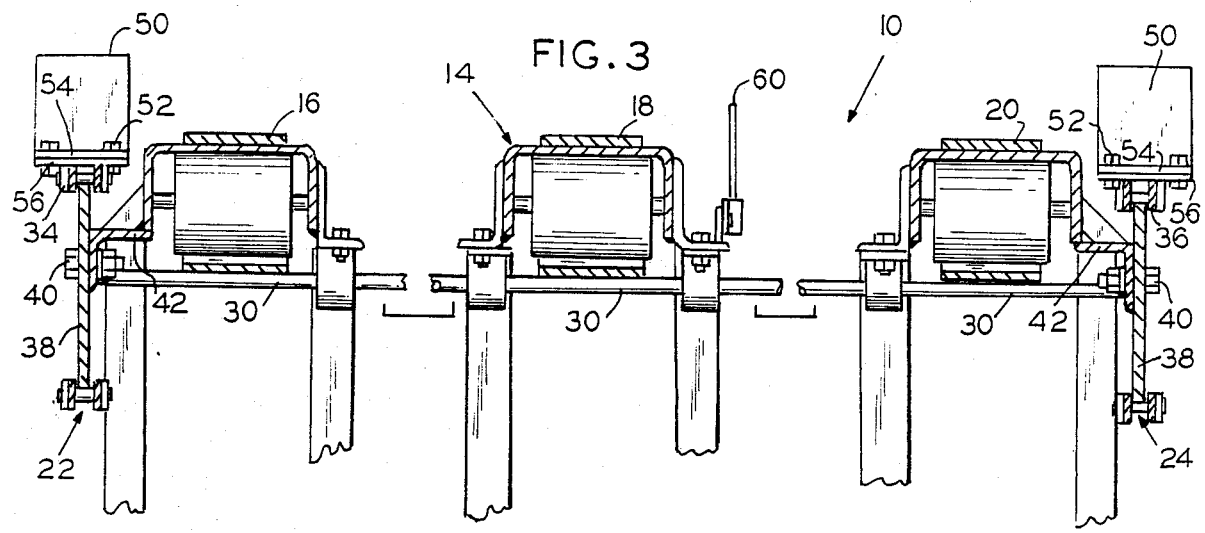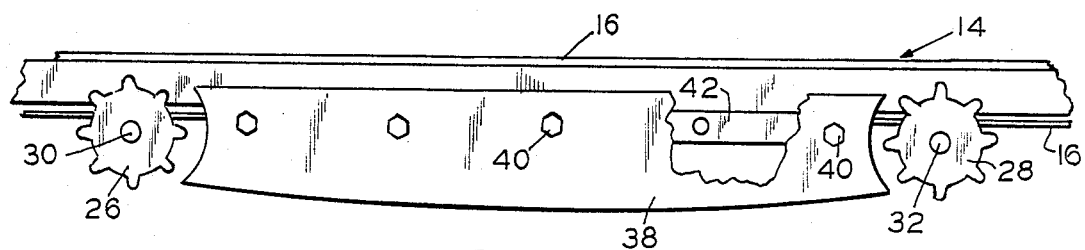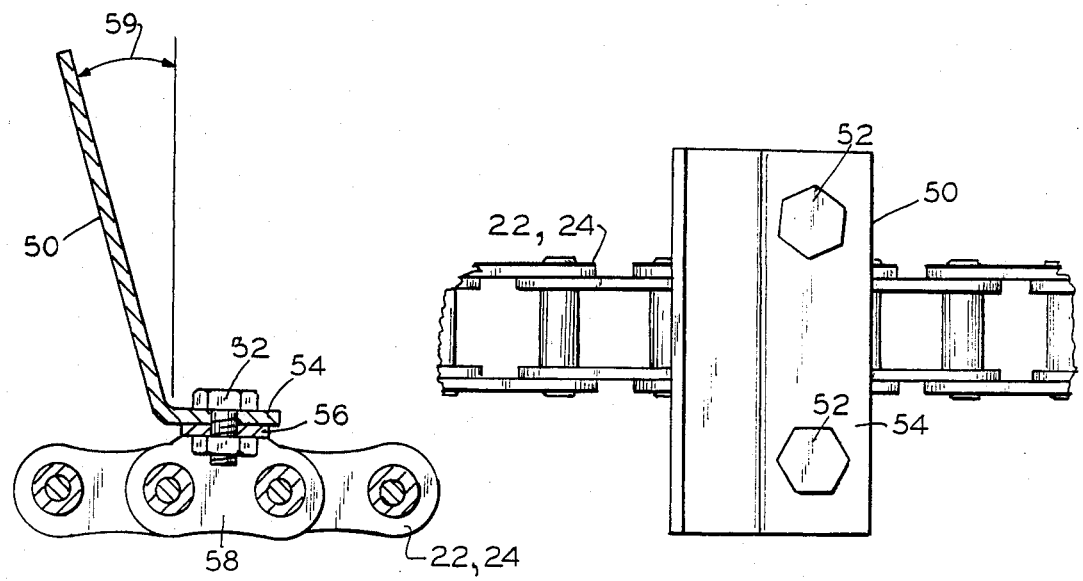

VENEER STRAIGHTENER

BACKGROUND OF THE INVENTION

1. Field of the Invention

This invention involves a veneer straightener, and, more particularly, a veneer straightening apparatus operating in conjunction with moving conveyor belts to straighten skewed veneer as it approaches a dry veneer stacker.

2. Description of the Prior Art

In forming plywood, veneer in the form of thin sheets of wood, usually either 27-inches or 54-inches wide by 8-, 9-, or 10-feet long, is used. Green veneer is dried in a veneer dryer. In coming out of the veneer dryer, the sheets of veneer normally travel along a conveyor belt to a veneer stacker where the sheets are stacked in a number of stacking bins according to their quality or grade.

As the dried veneer sheets progress along the conveyor belt from the dryer, it is common that they lie cross-wise on the moving conveyor at various angles. However, to create neat, uniform stacks of dry veneer, the skewed veneer sheets must be aligned or straightened before they enter the veneer stacker. It is difficult, if not impossible, to straighten the veneer sheets on the swiftly moving (e.g., 500-feet per minute) conveyor systems commonly utilized without either significantly reducing the efficiency of the stacking operation or accepting ragged, uneven stacks of dry veneer.

What is needed is a means of straightening skewed sheets of dry veneer prior to their entry into the veneer stacker, without significantly reducing the feed rate or efficiency of the stacking operation.

SUMMARY OF THE INVENTION

The present invention provides an veneer straightener designed to satisfy the aforementioned need. The invention involves means to temporarily restrain the leading portion of the forward edge of a sheet of veneer moving on a conveyor until the trailing portion of the forward edge catches up, thereby squaring the sheet with its direction of travel on the conveyor.

Accordingly, the veneer straightener, in the preferred embodiment, comprises the endless chains outwardly flanking the sides of the conveyor, the endless chains each being mounted between a drive sprocket and an idler sprocket, with the drive sprockets and idler sockets being connected by a common drive shaft and idler shaft respectively. Mounted on the endless chains are a pair of upwardly extending lugs which are aligned with each other transverse to the longitudinal axis and direction of movement of the conveyor, and which extend above the moving conveyor belts. The endless chains are driven, through the drive sprockets and drive shaft, by an appropriate source of power, such as an electric motor with an engaging clutch, or a pneumatic or hydraulic motor, so as to move the upwardly extending lugs in the direction of forward movement of the conveyor at a speed slower than that of the conveyor.

Switching means, such as a limit switch, are triggered by a sheet of veneer moving on the conveyor as it approaches the veneer straightener, which initiates the drive power means and starts the forward movement of the lugs mounted on the endless chains. Since the lugs are moving slower than the sheet of veneer on the conveyor, the leading portion of the forward edge of the skewed sheet of veneer will catch up to, and engage one lug whereby that portion of the sheet of veneer will be slowed to the speed of that lug while the trailing portion of the forward edge will continue forward at approximately the speed of the conveyor until it catches up with the other lug, thereby squaring the forward edge of the sheet of veneer with the direction of travel. When the lugs on the endless chains reach the forward sprocket, preferably the drive sprocket, the lugs will follow the sprocket down and away from their restraining engagement with the forward edge of the sheet of veneer, and the squared sheet will resume the forward speed of the conveyor. Having dropped from engagement with the sheet of veneer, a lug will trip a second switch, which will cause the drive power means to disengage and the endless chains will stop.

Two pairs of lugs may be utilized, being positioned on the endless chains so that when the second switch stops the progress of the endless chains and a first set of lugs, a second set of lugs is automatically stopped at the starting position relative to the first or movement initiating switch, thereby fully utilizing the length of the pair of endless chains with minimum delay straightening operations.

BRIEF DESCRIPTION OF THE DRAWINGS

FIG. 1 illustrates a plan view of the veneer straightener as combined with conveyor means.

FIG. 2 illustrates a side elevation view of the veneer straightener of FIG. 1.

FIG. 3 shows a cross section view of the veneer straightener, as seen at 3—3 of FIG. 1.

FIG. 4 shows a guide plate for an endless chain mounted between the drive and idler sprockets.

FIG. 5 shows a side view of the veneer sheet restraining means in the form of a lug attached to a roller chain.

FIG. 6 shows a top view of the lug attached to the roller chain of FIG. 5.

DESCRIPTION OF THE PREFERRED EMBODIMENT

Figure 7:
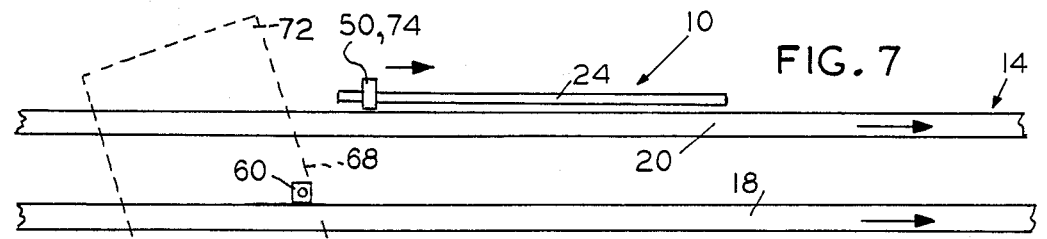
FIG. 7 through FIG. 10 provides a series of schematics illustrating sequentially the straightening operation of the present invention.

Referring now to the drawings, particularly FIG. 1 and FIG. 2, the preferred embodiment of the veneer straightener 10 may be seen. The veneer straightener operates in conjunction with conveyor means, illustrated as a three-belt conveyor 14 where the conveyor belts 16, 18 and 20 are powered in a conventional manner (not shown).

The veneer straightener 10 comprises two endless chains 22 and 24, preferably in the form of roller chains, outwardly flanking the outer conveyor belts 16 and 20. The endless chains 22 and 24 are each mounted between an idler sprocket 26 and a drive sprocket 28, the idler sprockets 26 and drive sprockets 28 also being positioned to the outside of the outer conveyor belts 16 and 20. The idler sprockets 26 are preferably mounted on a common idler shaft 30 which traversely spans the conveyor 14, while the drive sprockets 28 are mounted on a common drive shaft 32 which also transversely spans the conveyor 14. The drive shaft 32 and drive sprockets 28 are located forward, relative to the direction of the movement of the conveyor 14, so as to pull the upper portion 34 and 36 of the endless chains 22 and 24, respectively. A guide plate 38 may be attached, as with bolts 40, to the frame 42 supporting the conveyor belts 16 and 20. The guide plate 38, as better seen in FIG. 4, provides a guiding surface for the endless chains 22 and 24 to rest on and be shaped by, the upper portion 34 and 36 of the endless chains 22 and 24 preferably moving in a straight flat line.

The drive shaft 32, and thus the drive sprockets 28, endless chains 22 and 24, and idler shaft 30 are driven by an appropriate source of power, such as an electric motor 44 with an engaging clutch 46, through a drive belt or chain 48, or a pneumatic or hydraulic motor arrangement (not shown) so as to move the upper portions 34 and 36 of the endless chains 22 and 24 in the direction of forward movement of the conveyor 14. In operation, the speed of the endless chains 22 and 24 is less than the speed of the conveyor belts 16, 18, and 20, as is discussed subsequently.

Mounted on the endless chains 22 and 24 are lugs 50 which extend upwardly from the upper portions 34 and 36 as the endless chains 22 and 24 move between the idler sprockets 26 and the drive sprockets 28. A preferred manner of mounting the lugs 50 on the endless chains 22 and 24 is by bolts 52 through a lug base 54, where they connect with a base plate 56 which is fixed, as by welding, to a link 58 of the endless chain 22 or 24. This is best seen at FIG. 5 and FIG. 6. The lugs 50 themselves are inclined at an angle 59 of fifteen (15) degrees away from the direction of movement of the lugs 50 so as to prevent sheets of veneer from riding up and over the lugs 50, as will be described subsequently. The lugs 50 are mounted in pairs, each pair consisting of one lug 50 mounted on each endless chain 22 and 24 so that they are transversly aligned relative to the direction of movement of the conveyor 14. It is preferred that two separate pairs of lugs 50 be mounted on the endless chains 22 and 24 so that the position of each pair is located half way around the endless chain 22, 24, from the preceding pair, i.e., each endless chain 22 or 24 has two (2) equally spaced lugs 50 mounted on it.

Switching means, preferably in the form of limit switches, although other types of switches could prove satisfactory, are utilized to start and stop the veneer straightener 10. A first switch 60 is located along the conveyor 14, preferably along the center or inner conveyor belt 18, where it will detect the presence of a sheet of veneer proceeding along the conveyor 14 as it approaches the veneer straightener 10, and, being triggered, initiate movement of the endless chains 22 and 24 and their mounted lugs 50, such as by engaging a clutch 46 with the electric motor 44, as illustrated in FIG. 1 and FIG. 2. A second switch 64 may be located proximate to the lower forward portion of one of the drive sprockets 28, so that a lug 50, having followed the curvature of the drive sprocket 28 downward, will physically trigger switch 64, thereby stopping the operation of the veneer straightener 10, as by disengaging the clutch 46.

FIGS. 7 through 12 provide a sequential series of schematic views illustrating the operation of the veneer straightener 10. In FIG. 7, the skewed sheet of veneer 62, moving along the conveyor 14 has already bumped against and triggered the first switch 60, thereby activating the movement of the lugs 50 upon the endless chains 22 and 24 as described previously. The lugs 50, e.g., the lower lug 70 and upper lug 74 of the illustration, are moving in the same direction as the conveyor 14, but at a slower speed. The speed of the lugs may be approximately 80% of the speed of the conveyor 14, e.g., with a conveyor 14 speed of 500 feet per second, a lug 50 (70,74) speed would approximate 400 feet per minute. In FIG. 7, the leading portion 66 of the forward edge 68 of the skewed sheet of veneer 62 aboard the conveyor 14 has just come into contact with the slower moving lower lug 70.

Figure 8:
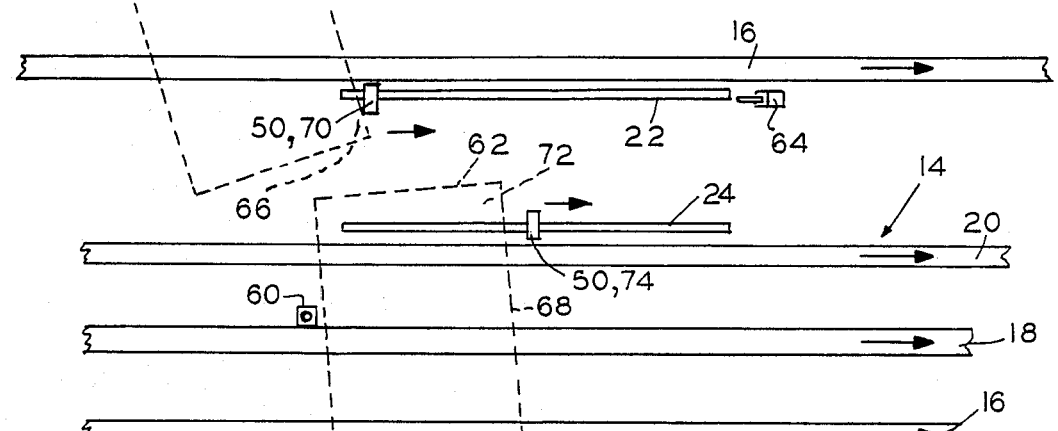

FIG. 8 provides a next view of of the veneer straightener 10 of FIG. 7 where the lugs 50, 70 and 74, have progressed further to the right, as illustrated. The leading portion 66 of the forward edge 68 of the sheet of veneer 62 remains in contact with its more slowly moving lug 70 while the upper and trailing portion 72 has been carried along by the conveyor belts 18 and 20 of conveyor 14 at their greater speed. Therefore, the trailing portion 72 has gained upon the leading portion 66 and the straightening process is under way.

Figure 9:
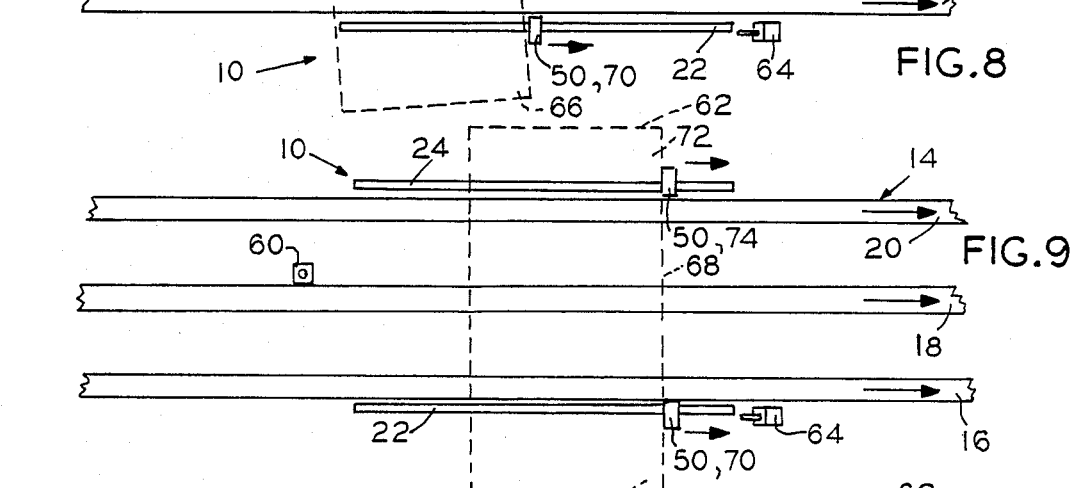

FIG. 9 provides the next sequential view where the previously termed leading portion 66 and trailing portion 72 are now both abutted against their respective lugs 70 and 74, and therefore are even, so that the forward edge is now transverse to the direction of movement of the conveyor 14. Forward movement of the sheet of veneer 62 is now at the forward speed of the lugs 70 and 74, preferably at approximately 80% of the forward speed of the conveyor 14.

Figure 10:
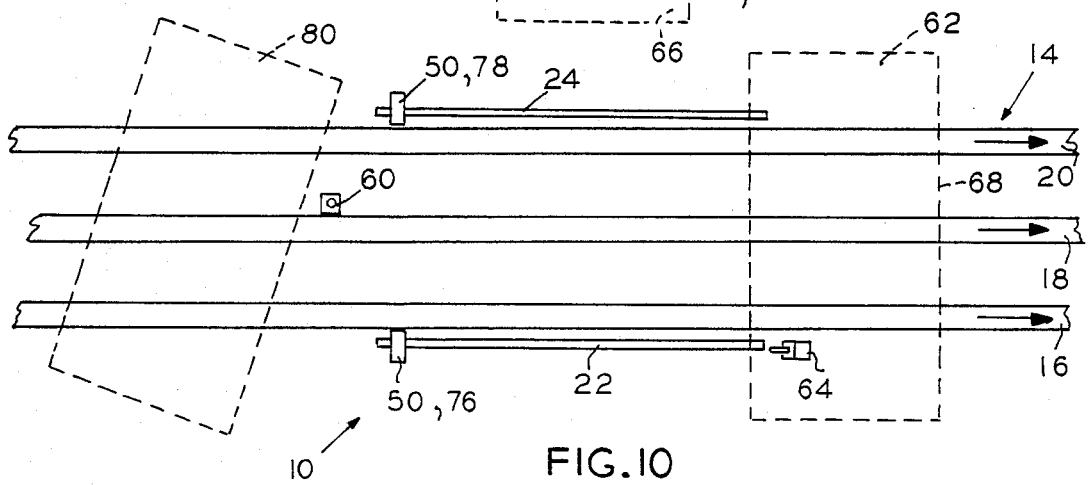

Finally, as shown in FIG. 10, the lugs 70 and 74 having rotated downward as part of the endless chains 22 and 24 following the curvature of the drive sprockets 28, as described previously, the restraining effect of the lugs 70 and 74 has terminated and once again the now-squared sheet of veneer 62 proceeds aboard the conveyor 14 at the forward speed of the conveyor belts 16, 18 and 20. The continuing movement of one of the lugs 50, lug 70 as illustrated, has triggered a second switch 64 which has stopped the movement of the endless chains 22 and 24 so that a second pair of lugs 50, shown as lugs 76 and 78, is now in position to engage and restrain a second skewed sheet of veneer 80 progressing along the conveyor 14, which is about to trigger the first switch 60 to initiate the straightening process with the sheet of veneer 80.

Thus the operation of the veneer straightener 10 permits alignment of skewed sheets of veneer aboard the existing conveyor 14 in preparation for the veneer stacker (not shown) without significantly reducing the flow of veneer sheets or the efficiency of the stacking operation. During the straightening operation, the individual sheets of veneer are never slowed to a forward speed on the conveyor 14 of less than the forward speed of the lugs 50, 80% of the speed of the conveyor 14 working well, and such slowing only occurs for the limited space where the veneer straightener 10 operates.

It is thought that the veneer straightener of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. An apparatus for straightening the orientation of skewed sheets of veneer being transported by conveyor means, in combination with the conveyor means, which comprises:
   a. conveyor means, having a forward moving surface upon which sheets of veneer are transported, wherein the conveyor means are operating at a first speed and the direction of movement of the conveyor means corresponds to the forward edge of the sheets of veneer;

b. veneer sheet restraining means formed to engage the forward edge of the sheets of veneer at spaced locations, a line extending between the spaced locations of engagement being transverse to the direction of movement of the conveyor means; and to move in the same direction of movement as the conveyor means but at a second speed, the second speed of the restraining means being slower than the first speed of the conveyor means;

c. said veneer sheet restraining means comprising:
two parallel endless chains outwardly flanking the conveyor means, the parallel endless chains each being mounted between an idler sprocket and a drive sprocket, the two drive sprockets being mounted on a common powered shaft; and a first pair of upwardly projecting lugs, a lug being attached at a common transverse location on each of the parallel endless chains, so as to, when moving forward adjacent to the forward moving surface of the conveyor means, extend above the forward moving portion of the conveyor means so as to engage the leading edge of the sheets of veneer moving on the conveyor means; wherein, with a sheet of veneer proceeding at an angular or skewed position with respect to the direction of movement of the conveyor, the forward edge of the skewed sheet will engage one lug before the other lug, so that the portion of the sheet of veneer engaging the first engaged lug will be slowed to the speed of said first engaged lug and the sheet of veneer will pivot about said first engaged lug until the forward edge also engages with the other lug; whereat the forward edge of the sheet of veneer will be at a right angle to the direction of travel of the conveyor and therefore squared with its direction of movement on the conveyor; the lugs, upon reaching a sprocket, will move from the plane of, and disengage from, the sheet of veneer, and the squared sheet of veneer will continue onward at the speed of the conveyor means;

switch means which comprise a first switch to be triggered by a sheet of veneer on the conveyor means approaching the veneer straightener, said first switch initiating power drive means, through the powered shaft, drive sprockets and endless chains, to move the pair of extending lugs forward at the said second speed; and a second switch positioned to be triggered by the passing of a lug, said second switch terminating said power drive means; and a second pair of lugs which are positioned on the endless chains midway around said endless chains, there thus being two equally spaced lugs on each endless chain; so that, when the second switch terminates the movement of the endless chains, the second set of lugs is stopped at a starting position relative to the first switch for use with a succeeding skewed sheet of veneer.

2. An apparatus for straightening the orientation of skewed sheets of veneer being transported by conveyor means, in combination with the conveyor means, which comprises:

a. conveyor means, having a forward moving surface, upon which sheets of veneer are transported, wherein the conveyor means are operating at a first speed and the direction of movement of the conveyor means corresponds to the forward edge of the sheets of veneer;

b. veneer sheet restraining means formed to engage the forward edge of the sheets of veneer at spaced locations, a line extending between the spaced locations of engagement being transverse to the direction of movement of the conveyor means; and to move in the same direction of movement as the conveyor means but at a second speed, the second speed of the restraining means being slower than the first speed of the conveyor means;

c. the veneer sheet restraining means comprising:
two parallel endless chains outwardly flanking the conveyor means, the parallel endless chains each being mounted between an idler sprocket and a drive sprocket, the two drive sprockets being mounted on a common powered shaft;
a pair of upwardly projecting lugs, a lug being attached at a common transverse location on each of the parallel endless chains, so as to, when moving forward adjacent to the forward moving surface of the conveyor means, extend above the forward moving portion of the conveyor means so as to engage the leading edge of the sheets of veneer moving on the conveyor means;
wherein, with a sheet of veneer proceeding at an angular or skewed position with respect to the direction of movement of the conveyor, the forward edge of the skewed sheet will engage one lug before the other lug, so that the portion of the sheet of veneer engaging the first engaged lug will be slowed to the speed of said first engaged lug and the sheet of veneer will pivot about said first engaged lug until the forward edge also engages with the other lug, whereat the forward edge of the sheet of veneer will be at a right angle to the direction of travel of the conveyor and therefore squared with its direction of movement on the conveyor; the engaged lugs, upon reaching a sprocket, will move from the plane of, and disengage from, the sheet of veneer, and the squared sheet of veneer will continue onward at the speed of the conveyor means; and d. switch means which comprise a first switch to be triggered by a sheet of veneer on the conveyor means approaching the veneer straightener, said first switch initiating power drive means, through the powered shaft, drive sprockets and endless chains, to move the pair of extending lugs forward at the said second speed; and a second switch positioned to be triggered by the passing of the lugs about the drive sprocket, said second switch terminating said power drive means.

3. The veneer straightener, as recited in claim 2, wherein, additionally, there are included a second pair of lugs which are positioned on the endless chains midway around said endless chains, there thus being two equally spaced lugs on each endless chain, so that, when the second switch terminates the movement of the endless chains, the second set of lugs is stopped at a starting position relative to the first switch for use with a succeeding skewed sheet of veneer.

4. The veneer straightener, as recited in claim 2, wherein the upwardly extending lugs are tilted away from their forward direction of movement at an angle of approximately fifteen degrees.

5. The veneer straightener, as recited in claim 2, wherein the forward speed of said lugs is approximately eighty percent of the speed of the forward moving surface of the conveyor means.

* * * * *